Aug. 17, 1926.

A. VORBERG, JR 1,596,131

COMBINED BATTERIES AND CHARGER FOR RADIO SYSTEMS

Filed Nov. 6, 1924     2 Sheets-Sheet 1

Inventor:
Albert Vorberg, Jr.,
by Walter E. Lombard,
Atty.

Aug. 17, 1926.
A. VORBERG, JR
1,596,131
COMBINED BATTERIES AND CHARGER FOR RADIO SYSTEMS
Filed Nov. 6, 1924
2 Sheets-Sheet 2
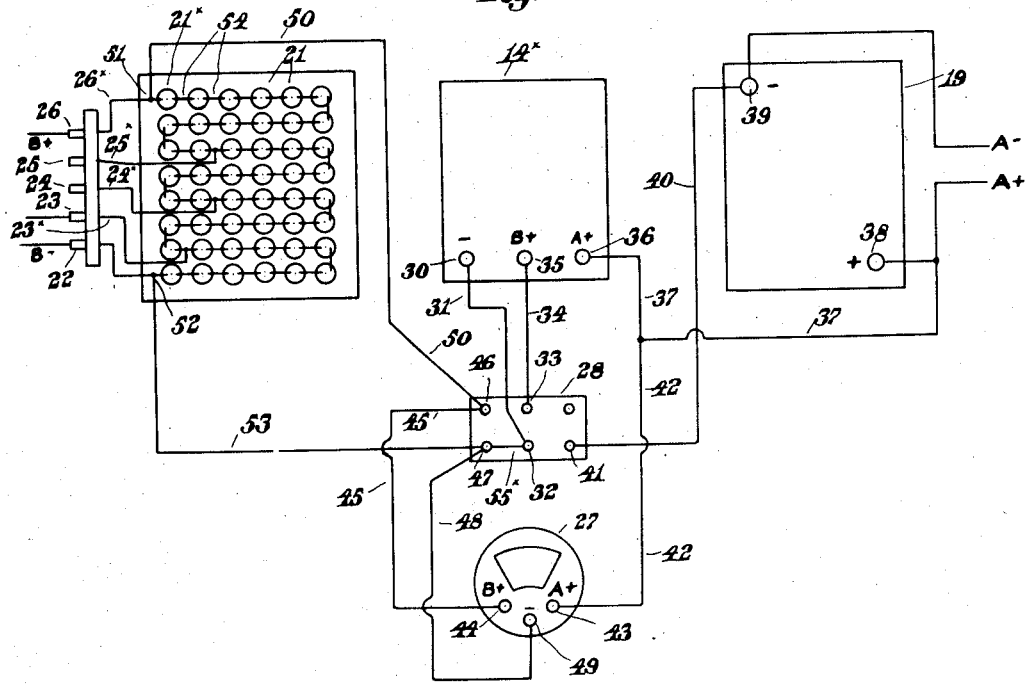
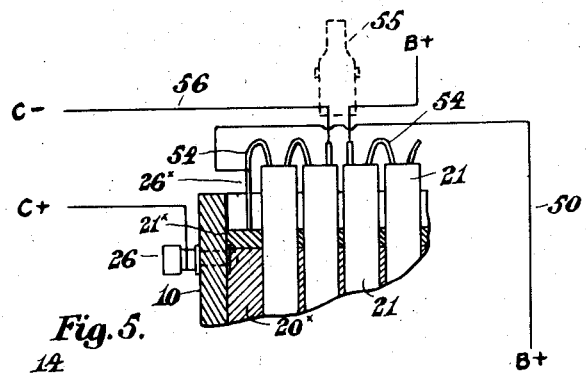
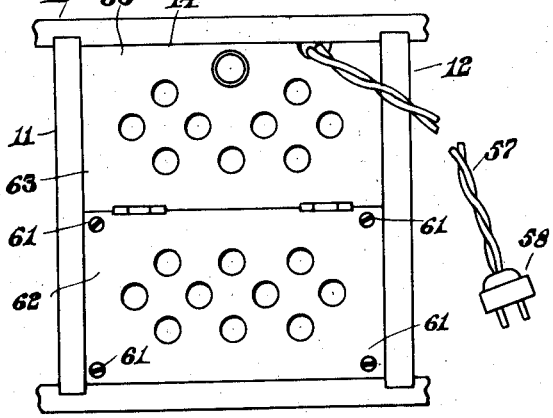
Inventor:
Albert Vorberg, Jr.,
by Walter E. Lombard,
Atty.

Patented Aug. 17, 1926.

1,596,131

UNITED STATES PATENT OFFICE.

ALBERT VORBERG, JR., OF ARLINGTON, MASSACHUSETTS, ASSIGNOR TO PERRINE QUALITY PRODUCTS CORP., OF BOSTON, MASSACHUSETTS, A CORPORATION OF MASSACHUSETTS.

COMBINED BATTERIES AND CHARGER FOR RADIO SYSTEMS.

Application filed November 6, 1924. Serial No. 748,266.

This invention relates to batteries for radio receiving sets and means for charging the same, the object of the present invention being to provide a compact cabinet in which are installed the necessary batteries and a device for charging the batteries.

The invention consists in the installation between an A battery and a B battery of a charger connected through a switch with both batteries, either of which may be charged by actuating the switch.

The invention further consists in the installation of a voltmeter between said switch and batteries whereby the voltage of either battery may be indicated.

The invention consists further in providing said cabinet with partitions completely separating the three compartments in which said batteries and charger are positioned.

The invention consists further in the provision of means whereby the direct voltage of either of the batteries may be obtained while said batteries are charging or while the set is being operated.

The invention consists further in means whereby the B battery on loop sets, or sets not using a ground, may be charged while operating the set.

The invention consists further in means whereby the B battery may be used as a whole or separated into a B battery and a C battery.

The invention consists further in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized and the invention is not limited to the precise arrangement and organization of these instrumentalities as herein shown and described except as required by the scope of the appended claims.

Of the drawings—

Figure 3 represents a diagram showing the wiring of the said device.

Figure 4 represents a diagram showing the wiring when two cells are cut out of B battery to form a C battery.

Figure 5 represents a plan of the central portion of the device showing the protecting cover for the charger, and Figure 6 represents an elevation of one of the clips used in the device.

Similar characters indicate like parts throughout the several figures of the drawings.

Figure 1:
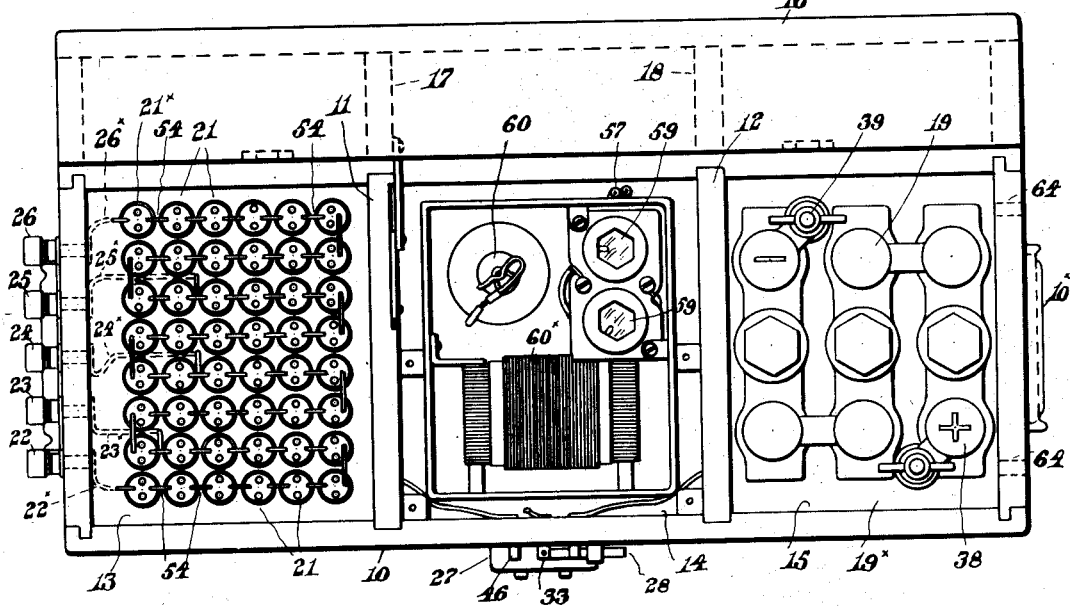
Figure 1 represents a plan of a device embodying the principles of the present invention, the cover being shown in open position.
Figure 2:
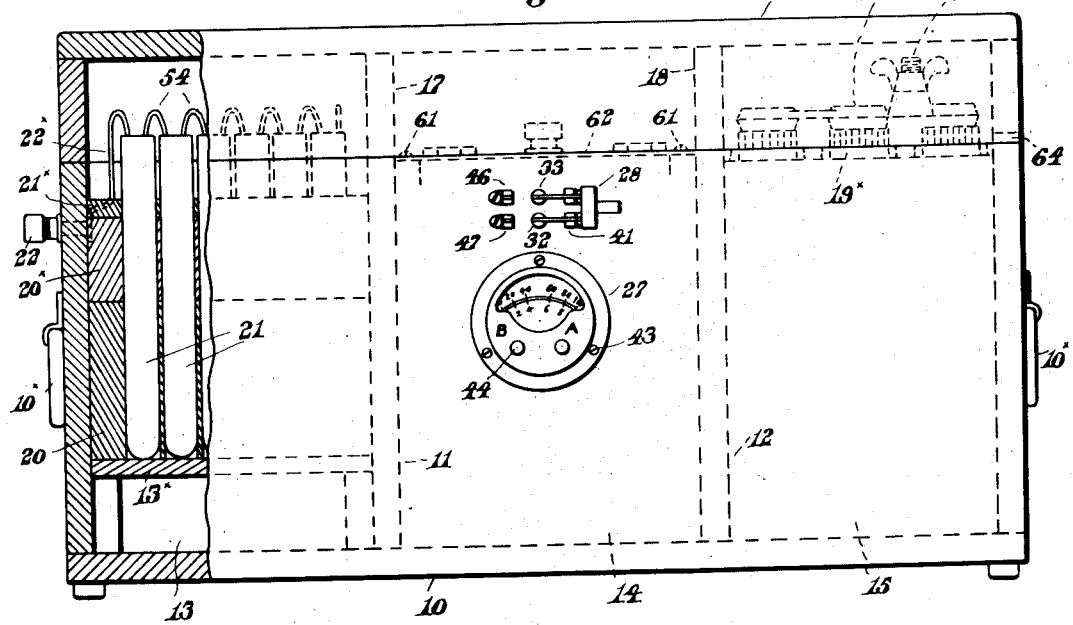
Figure 2 represents a front elevation of the same with the cover closed, a portion at the left being broken away.

In the drawing 10 is a cabinet divided by the partitions 11, 12, into three compartments 13, 14, and 15, said cabinet 10 having hinged thereto a cover 16 provided with the partitions 17 and 18 adapted to register with the partitions 11, 12, when the cover 16 is closed.

The partitions 11, 12, 17 and 18, prevent any spray or gas generated in either compartment from entering either of the other compartments during the charging of either of the batteries.

In the compartment 15 is positioned an A battery 19 of usual construction, said battery being embedded in a sealing compound $19^x$ filling said compartment to a level a short distance below the top of the cabinet 10.

The compartment 13 has positioned therein a box 20 containing a plurality of cells 21 of a B battery, said cells being embedded in paraffine $20^x$ covered with a layer of sealing compound $21^x$, the top of which preferably is about one half inch below the top of the cabinet 10, thus leaving a space in which may collect any electrolyte spilled in filling or charging the cells 21.

The box 20 rests upon a shelf $13^x$ near the bottom of the compartment 13.

From the end of the cabinet adjacent the compartment 13 extend five binding posts or terminals, 22, 23, 24, 25, and 26, the binding post 22 being connected to the first negative pole of the B battery by wire $22^x$, while the binding post 26 connects by wire $26^x$ to the last positive pole of said B battery which binding post has a 96 voltage. The other binding posts 23, 24, 25, are connected by wires 23ˣ, 24ˣ, and 25ˣ, to other positive poles of the B battery to obtain 22½, 45, and 67½ volts respectively.

By hooking up the receiving set with the binding post 22 and either of the binding posts 23, 24, 25 or 26, a variation of voltage may be obtained.

On the front of the cabinet 10 is mounted a voltmeter 27, and above the same is a double pole, double throw knife switch 28, while the ends of said cabinet are provided with handles 10ˣ.

In the central compartment 14 is installed a charger 14ˣ having its negative pole 30 connected by wire 31 to the hinge joint 32 of switch 28, the other hinge joint 33 being connected by wire 34 to a positive pole of said charger 14ˣ.

This charger also has another positive pole 36 connected by wire 37 to the positive pole 38 of the A battery.

The negative pole 39 of the A battery is connected by wire 40 to the switch contact 41.

The positive pole 36 of the charger 14ˣ is also connected by wire 42 with a positive pole 43 of the voltmeter 27, which has another positive pole 44 connected by wire 45 with the switch contact 46.

The contact 47 of the switch 28 is connected by wire 48 to the negative pole 49 of the voltmeter 27.

The voltmeter 27 may be of any well known construction and therefore requires no further illustration, it being understood that the poles 43, 44, are in the form of push buttons which may be pressed inwardly to obtain a reading, as is usual in some forms of voltmeters.

The switch contact 46 is also connected by wire 50 with the positive pole 51 of the B battery, the negative pole 52 of said battery being connected by wire 53 to the contact 47, which contact is also connected with the switch joint 32 of the switch 28 by means of a wire 55ˣ.

When the switch 28 connects with the contact 41 the A battery may be charged and the voltage of said battery may be indicated by pressure upon the pole or button 43 thereof.

If the switch is moved into its opposite position so as to connect with the contacts 46, 47, the B battery may be charged and the voltage of this battery may be indicated by pressure on the pole or button 44, or when the switch 28 is in its right hand position the voltage of B battery may be indicated by pressure on the pole or button 44.

The radio receiving set is hooked up to the binding posts 22, 23, 26, if the detector tube requires a 22½ voltage of the B battery, and to the binding posts 22, 24, 26, if a greater voltage for the detector tube is desired, it being understood that under these conditions the binding posts 26 is electrically connected to the amplifier tubes. When less voltage is required for the amplifier tubes they may be electrically connected to the binding post 25 for 67½ volts or to the binding post 24 for 45 volts.

The poles of the cells 21 of the B battery are connected by leads 54 and all these cells are connected in series.

If it is desired to utilize one portion of B battery as a C battery, one set of leads 54 at the back of the B battery is severed at any desired point, the point selected depending on the amount of voltage desired in the C battery, as for instance 2, 4, or 6 volts; one, two or three cells being cut off from the remaining cells 54. The cells cut off for C battery must include the left cell 21ˣ in the rear row as this is connected to the terminal or binding post 26.

The C battery negative lead of the receiving set is then passed through a notch in the end of cover and either soldered or clamped to the negative pole of the selected cell, the C battery positive lead from the set being connected to the binding post 26.

If it is desired to employ in the B battery, the maximum remaining voltage, the proper lead from the receiving set is passed through a notch in the end of cover and either clamped or soldered to the positive pole of cell where the division has been made.

When a C battery is formed in this manner it becomes necessary to clamp by means of the clip 55 the negative and positive poles at the point where division has been made whenever it is desired to charge or take a voltage reading of the B battery.

By this means both batteries, B and C, may be charged at the same time and no switching from one to the other is necessary.

It must be understood that if the detector tube requires only 22½ volts, said detector tube is wired to the binding post 23, and if it requires 45 volts the wire is secured to binding post 24, and that in case the amplifier tubes only require 67½ volts the wire from the receiving set extends to binding post 25 and not to binding post 26.

If any voltage of B battery is desired, other than that obtained from the binding posts 23, 24, 25, 26, a similar clip 55 is clamped to the positive lead of an intermediate cell 21 and connected by a wire to the receiving set.

By means of this hook up any desired voltage up to and including 96 volts may be obtained from the B battery, and this is true for a slightly less voltage when the C battery is used.

The charger 14ˣ is provided with a wire 57 having an element 58 which may be connected to an electric light socket in order to obtain the necessary electric current to charge the A battery and also the B and C batteries in series up to 120 volts, the charger being provided with a 6 ampere fuse 59 for each battery to prevent the amperage exceeding a predetermined limit.

The charger is also provided with a device 60 for rectifying the alternating current to a direct current when the element 58 is connected to an alternating current lighting system. The charger is also provided with a closed core type transformer 60ˣ.

As the details of construction of the charger form no part of the present invention, it is deemed unnecessary to illustrate or describe its make up.

In order to protect the various parts of the charger from injury, the compartment 14 has secured therein by screws 61 a perforated top plate 62 having a hinged section 63 which may be moved about its hinge connections to give access to the rectifier 60 and the fuses 59.

When the A battery is being charged the rear fuse 59 is removed or unscrewed sufficiently to break contact, but when the B battery is being charged both fuses 59 must be in contact. The rear fuse 59 must also be unscrewed sufficiently to break contact when the receiving set is in use.

One particular advantage of the device is that the A battery may be charged while operating the receiving set, while another advantage is that the B battery may also be charged while operating a receiving set having a loop or any set not having a ground.

As all the connections of the device are permanent there is absolutely no opportunity for burning out tubes which is manifestly a great advantage and this is particularly true where the device is used in connection with a super hetrodyne receiving set having a plurality of tubes.

There are no moving parts within the cabinet and consequently the device is noiseless.

It is very simple to operate, as when the A battery is to be charged all that it is necessary to do is to turn the switch 28 toward the A battery and by turning the switch toward the B battery this latter battery may be charged.

The cover 16 is deep enough to receive the clips 55 and enclose the same when the cover 16 is closed.

Adjacent the A battery the end wall of the cover 16 is provided with notches 64 through which the wires from A battery to receiving set may extend when the cover is closed.

Heretofore, the means generally employed to secure power to light the tubes of the radio receiving set has been a large cumbersome storage A battery, which occupies considerable space, and is liable to leak and injure any article with which the leaking electrolyte comes into contact. Or for the same purpose dry cells have been used, but these cells soon deteriorate so as to become useless.

The plate voltage has usually been obtained from a plurality of dry cells in series forming the B battery. These cells are expensive and in course of time deteriorate rapidly and become useless when the voltage has dropped to a certain point for they cannot be recharged.

At the present time, it is recognized that the logical means to be employed to provide the power for the receiving set is as follows: 1, a storage A battery for lighting the filament of the detector and amplifying tubes; 2, a storage B battery for giving the proper voltage to the plates; 3, a storage C battery to provide the proper voltage to the grids.

Up to the present time the problem has been to provide an efficient device which would use the alternating current from a lighting system and charge the various storage batteries without disconnecting the same from the radio receiving set.

It will be noted that in the present device the alternating current may be transformed into a direct current which in turn will charge either the A battery or the B and C batteries without disconnecting from the receiving set and all the various units of the device are installed in a single housing or cabinet.

In using the device the cells of the various batteries A, B and C must be filled with electrolyte.

The switch 28 is then turned to left to charge the B battery or the B and C batteries, the button 44 of voltmeter being pressed from time to time until the voltmeter indicates that a voltage of 90 or more has been reached.

The switch 28 is then turned to right to test the A battery voltage, pressing upon the button 43 to see by the voltmeter that said battery has a voltage of 6 or more.

The binding post 22 is connected to the negative terminal of the receiving set, and the binding post 23 or 24 is connected to the detector tube of said set depending on the type of tube used, while the amplifier tubes are connected to either of the binding posts 24, 25 or 26 as desired.

The device is then in condition for use to give the required power to the receiving set, provided only the A and B batteries are to be used.

In case a C battery is to be used, the changes previously described herein will be made.

It is believed that the operation and many advantages of the invention will be fully apparent without further description.

Having thus described my invention, I claim—

1. In a device of the class described, the combination of A and B batteries and a charger; a voltmeter; and a double pole double throw knife switch having hinge connections electrically connected by wires to the negative pole and a positive pole of said charger and provided at one end with a contact electrically connected by a wire to the negative pole of the A battery, the positive pole of which is electrically connected to a positive pole of the charger, this latter pole being also connected to a positive pole of said voltmeter, said switch also having two contacts at the opposite end thereof, one of which is electrically connected to a positive pole of the voltmeter and also the positive pole of the B battery of which the negative pole is connected to a hinge connection of said switch and also to the other switch contact, this switch contact being also connected to the negative pole of the voltmeter.

2. In a device of the class described, the combination of A and B batteries and a charger adapted to charge either battery; and a knife switch having its hinge connections electrically connected to the negative pole and a positive pole of said charger and also having a contact electrically connected to the negative pole of the A battery of which the positive pole is electrically connected to another positive pole of the charger.

3. In a device of the class described, the combination of A and B batteries and a charger adapted to charge either battery; a knife switch having its hinge connections electrically connected to the negative pole and a positive pole of said charger and also having a contact electrically connected to the negative pole of the A battery, of which the positive pole is electrically connected to another postive pole of the charger; and a voltmeter having a positive pole electrically connected to a positive pole of the charger and a negative pole electrically connected to a hinge connection of said switch.

Signed by me at 746 Old South Bldg., Boston, Massachusetts, this 3rd day of November, 1924.

ALBERT VORBERG, Jr.